United States Patent
Henn et al.

(10) Patent No.: US 8,822,033 B2
(45) Date of Patent: Sep. 2, 2014

(54) TRANSPARENT GLASS OR GLASS CERAMIC PANE WITH A LAYER THAT REFLECTS INFRARED RADIATION

(75) Inventors: Christian Henn, Frei-Laubersheim (DE); Veit Luther, Hattersheim (DE); Andreas Hahn, Hochstetten-Dhaun (DE); Wolfgang Schmidbauer, Mainz (DE); Torsten Gabelmann, Wiesbaden (DE)

(73) Assignee: Schott AG, Mainz (DE)

( * ) Notice: Subject to any disclaimer, the term of this patent is extended or adjusted under 35 U.S.C. 154(b) by 1156 days.

(21) Appl. No.: 12/751,373

(22) Filed: Mar. 31, 2010

(65) Prior Publication Data

US 2010/0261009 A1 Oct. 14, 2010

(30) Foreign Application Priority Data

Mar. 31, 2009 (DE) .......................... 10 2009 015 086

(51) Int. Cl.
*C03C 17/23* (2006.01)
*C03C 17/34* (2006.01)

(52) U.S. Cl.
CPC ........... *C03C 17/23* (2013.01); *C03C 2217/212* (2013.01); *C03C 2217/218* (2013.01); *C03C 17/3417* (2013.01); *Y10S 428/92* (2013.01)
USPC ........... 428/432; 428/428; 428/688; 428/702; 428/920

(58) Field of Classification Search
USPC ........................... 428/428, 432, 688, 702, 920
See application file for complete search history.

(56) References Cited

U.S. PATENT DOCUMENTS

| | | | | |
|---|---|---|---|---|
| 4,216,259 A | * | 8/1980 | Groth | 428/216 |
| 4,271,210 A | * | 6/1981 | Yoldas | 427/169 |
| 4,995,895 A | * | 2/1991 | Groth et al. | 65/60.2 |
| 5,059,295 A | * | 10/1991 | Finley | 204/192.27 |
| 6,362,414 B1 | | 3/2002 | Fujisawa et al. | |
| 6,416,890 B1 | | 7/2002 | Terneu et al. | |
| 7,083,857 B2 | * | 8/2006 | Sawada et al. | 428/432 |
| 7,449,244 B2 | | 11/2008 | Vilato et al. | |
| 2002/0028361 A1 | | 3/2002 | Boire et al. | |
| 2005/0064205 A1 | | 3/2005 | Sawada et al. | |

FOREIGN PATENT DOCUMENTS

| | | | |
|---|---|---|---|
| GB | 2281746 | * | 3/1995 |
| JP | 01138159 | | 5/1989 |
| JP | 073334423 | | 12/1995 |

OTHER PUBLICATIONS

Valley design (http://www.valley design.com/sodalime.htm) , obtained 2013.*
Azom (http://www.azom.com /article.aspx?ArticleID=1179), obtained 2013.*
Office action dated Sep. 29, 2011, corresponding to European Patent Application No. 10 003 455.2-1218.
Vogel, W., "Glass Chemistry;" Second Ed., 1925, ISBN 0-387-57572-3, pp. 138 and 295-297.
Office action dated Aug. 8, 2012, corresponding to German Patent Application No. 10 2009 015 086.2 with English Translation.
Search Report for corresponding European Patent Application No. 10003455.2-1218 dated Sep. 14, 2010.

* cited by examiner

*Primary Examiner* — Archene Turner
(74) *Attorney, Agent, or Firm* — Ohlandt, Greeley, Ruggiero & Perle, LLP

(57) ABSTRACT

A transparent glass or glass ceramic pane is provided that includes a glass or glass ceramic substrate having a thermal expansion coefficient α of less than 4.2 and an infrared radiation-reflecting layer, formed as a single-layer reflection layer and having a refractive index greater than 2.2.

18 Claims, 4 Drawing Sheets

US 8,822,033 B2

TRANSPARENT GLASS OR GLASS CERAMIC PANE WITH A LAYER THAT REFLECTS INFRARED RADIATION

CROSS REFERENCE TO RELATED APPLICATIONS

This application claims benefit under 35 U.S.C. §119(a) of German Patent Application No. 10 2009 015 086.2, filed Mar. 31, 2009, the entire contents of which are incorporated herein by reference.

BACKGROUND OF THE INVENTION

1. Field of the Invention

The invention relates to a glass or glass ceramic pane that reflects infrared radiation as well as a method for producing it. In particular, the invention relates to a viewing pane for high-temperature applications, such as, for example, a front pane for an oven or a fireplace, as well as fire-protection glazing.

2. Description of Related Art

Panes that reflect infrared radiation, in particular viewing panes for ovens and fireplaces, are known. These are, as a rule, constructed as a substrate made of a glass having a low thermal expansion coefficient or from a glass ceramic. Applied to the substrate glass is a coating that has a lower transmission in the infrared region than in the region of visible light.

Thus, the infrared radiation that passes through the pane is appreciably reduced and both a strong heating of the pane and also a strong heating of the adjoining surroundings are prevented.

Known from practice are, for example, titanium oxide/silicon oxide coatings, in particular interference alternating layer systems, which, however, are not relevant in implementation from an economic viewpoint.

A drawback of the known coatings is, besides the great expense of applying such layers, their low heat resistance; in particular, many known transparent conductive coatings (TCCs) lose their reflecting effect at temperatures above 450 degrees Celsius (° C.).

Furthermore, conventional coatings are only suitable in a limited manner for curved glass ceramics, because it is difficult to furnish a curved glass with a homogeneous layer thickness.

A coating of the blank (i.e., green glass) prior to ceramization and bending, on the other hand, is not possible as a rule, because conventional coatings are damaged or destroyed during ceramization.

BRIEF SUMMARY OF THE INVENTION

By contrast, the problem of the invention is to produce a heat-stable transparent glass or glass ceramic pane that reflects infrared radiation, for which the drawbacks of prior art are at least reduced.

In particular, the glass or glass ceramic pane should be easy to produce in a cost-effective manner and have a uniform optical appearance.

The problem of the invention is solved already by a transparent glass or glass ceramic pane as well as a method for the production of a transparent glass or glass ceramic pane that reflects infrared radiation in accordance with the present disclosure.

Accordingly, the invention relates to a transparent glass or glass ceramic pane, which comprises a glass or glass ceramic substrate having a thermal expansion coefficient $\alpha$ of less than $4.2 \times 10^{-6}$/K, preferably of less than $3.5 \times 10^{-6}$/K.

Accordingly, what is involved is a heat-stable substrate glass or a so-called zero-expansion material, a glass ceramic. "Transparent" is understood to mean that the pane has an adequate transmission in the visible region so as to be able to look through the pane; hence, the pane is suitable as a viewing pane. It is obvious, however, that also a tinted pane is additionally understood as being "transparent" in the intendment of the invention.

A layer that is likewise transparent in the visible region and that reflects infrared radiation is applied to the transparent glass or glass ceramic substrate. The layer that reflects infrared radiation is formed as a single-layer reflection layer with a refractive index greater than 2.2. Preferably, the refractive index is greater than 2.4.

A single-layer reflection layer is understood to mean a layer that, in contrast to the alternating layer systems working according to the interference principle already has, as a single layer, infrared radiation-reflecting characteristics. Layers having a high refractive index and, in particular, as provided for in a preferred embodiment of the invention, titanium oxide layers have proven suitable for this purpose.

The definition of single-layer reflection layer does not rule out the presence of several layers.

The inventors have found that, in particular, layers formed as a crystalline layer can be deposited on a substrate and, in this case, are transparent without thermal post-treatment and have infrared-reflecting characteristics. Niobium oxide and tantalum oxide come into consideration as alternatives.

Titanium oxide is especially economical and can, as the inventors have found, be applied by means of deposition processes, such as sputtering, as a crystalline layer. In this case, particularly titanium oxide in the anatase phase or in the rutile phase are involved.

In an embodiment of the invention, the layer that reflects infrared radiation adjoins directly the glass or glass ceramic substrate. The layer is thus applied without further intermediate layers. The inventors have found that, in particular on flat glasses, it is possible to deposit titanium oxide layers directly on the glass substrate and, in doing so, to form an abrasion-resistant crystalline layer.

Preferably, the glass or glass ceramic substrate is heated prior to application of the layer, in particular to 200 to 400° C., which further improves the adhesion stability of the layer.

In an alternative embodiment of the invention, an adhesion-mediating layer is arranged between the layer that reflects infrared radiation and the glass or glass ceramic substrate.

Coming into consideration as adhesion-mediating layers are, for example, silicon oxide, aluminum oxide, or deposited soft silicon-containing layers having a high proportion of carbon.

The use of an adhesion-mediating layer as intermediate layer is provided for, in particular, when the glass is further processed after the coating, with it being subject to high thermal and/or mechanical loads.

Adhesion-mediating layers can ensure, in particular, that the infrared radiation-reflecting layer according to the invention, applied to a green glass, also withstands a subsequent ceramization process, if necessary also the deformation, particularly the bending, of the heated glass or glass ceramic substrate to form a curved pane.

The layer that reflects infrared radiation can have a thickness of between 20 and 600 nanometers (nm), preferably between 50 and 400 nm, particularly preferably between 70 and 200 nm.

The inventors have found that it is possible, by way of the layer thickness, to control the color impression of the pane, in particular, as well as the reflection maximum in the infrared.

Already at a wavelength above 1000 nm, preferably already above 800 nm, and particularly preferably above 700 nm, the glass or glass ceramic pane already has, in a preferred problem of the invention, a degree of reflection of more than 20%, preferably more than 30%.

In the region of visible light, by contrast, the mean degree of transmission can be greater than 40%, preferably greater than 50%, and particularly preferably greater than 70%.

The transparent glass or glass ceramic pane can, in particular by use of titanium oxide layers of different thickness, be formed so as to be colored, particularly to have a yellow, red, green, or blue color impression.

In particular, the invention relates to curved glass or glass ceramic panes.

In a special embodiment of the invention, the layer that reflects infrared radiation has a reflection maximum already at below 2500 nm, preferably below 2000 nm, and particularly preferably below 1600 nm. This is particularly important in the case when high temperatures occur during use, because, then, the maximum of the emission lies in a low wavelength range of less than 2.5 µm.

Furthermore, in particular, deposited crystalline titanium oxide layers are formed for a constant-use temperature of greater than 600° C., preferably of greater than 800° C.

In a further development of the invention, a further layer, in particular an anti-reflective layer, can be arranged on the layer that reflects infrared radiation. Thus, for example, an alternating layer system, which reduces reflections in the region of visible light, can also be deposited on the layer that reflects infrared radiation. The reflecting characteristics in the infrared region are maintained in this case.

It is also conceivable, as provided in a further development of the invention, to apply a further layer, which neutralizes a coloration due to the layer that reflects infrared radiation. In particular, a colored layer that compensates for the color impression of the layer that reflects infrared radiation can be applied.

In a preferred embodiment of the invention, the layer the reflects infrared radiation is formed as a dense layer, in particular one having a degree of porosity of less than 10%, preferably of less than 5%, particularly preferably of less than 2%.

In accordance with the invention, layers that reflect infrared radiation can have a reflection maximum in a wavelength range between 700 and 2000, preferably between 800 and 1700.

The invention is suitable, in particular, as a front pane for a fireplace or oven, as well as for fire-protection glazings, in particular for fire-protection doors or windows. The pane according to the invention can also be used for an oven muffle.

The invention relates, furthermore, to a method for producing a transparent glass or glass ceramic pane that reflects infrared radiation, in particular as described above.

In accordance with the invention, a glass or glass ceramic substrate having a thermal expansion coefficient α of less than 4.2, preferably of less than 3.5, is provided.

A layer that reflects infrared radiation and has a refractive index greater than 2.2 is applied to the glass or glass ceramic substrate.

Preferably, the layer that reflects infrared radiation is deposited as a crystalline layer. In particular, also large areas having a uniform layer thickness can be coated by means of a magnetron sputtering process.

In particular, it is possible to use reactive sputtering processes in which a metallic titanium target is used.

The invention relates further to the use of a deposited titanium oxide layer as an infrared radiation-reflecting single-layer coating on a transparent heat-stable substrate having a thermal expansion coefficient α of less than 4.2.

In accordance with an exemplary embodiment of the invention, a titanium oxide layer with a thickness of 150 to 250, particularly about 200 nm, is deposited on a flat glass ceramic substrate by means of middle frequency sputtering. To this end, the substrate undergoes thermal pretreatment in a pretreatment step, preferably at a temperature of 350° C. to 450° C. over a period of time of at least 3 minutes, preferably over 10 minutes.

The baking takes place preferably in vacuum and leads to the vaporization of excess water from the substrate surface.

Subsequently, the substrate is placed in the process chamber and the titanium oxide layer is deposited reactively by repeated travel past a sputtering source. In this process, a pulse frequency of 5 to 10 kHz is set and, in this way, a high sputtering power of 15 W/cm$^2$ is selected.

As a result of the high particle flow adjusted in this case and, simultaneously, a low process pressure of about $10^{-3}$ mbar, it is possible to produce dense titanium oxide layers having a pronounced crystalline phase, which leads to a high transparency in the visible region and, at the same time, to a high refractive index of the coating.

The process can be reactively sputtered from a metallic titanium target. Required for stabilization of the process in this case is a control.

Alternatively, therefore, sputtering can take place also from a ceramic TiO$_2$ target and, in this way, it is possible to dispense with a complex control of the plasma intensity.

Following the production of the layer, the substrate, coated with a titanium oxide layer, can be used as a fireplace viewing pane, for example.

DETAILED DESCRIPTION OF THE INVENTION

The invention will be described in greater detail below with reference to schematically illustrated exemplary embodiments based on the drawings FIG. 1 to FIG. 5.

Figure 1:
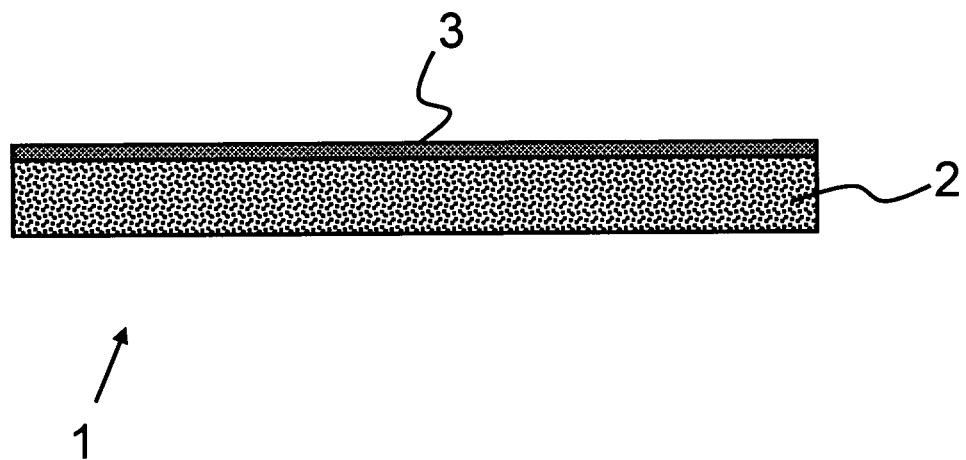
FIG. 1 shows, in schematic illustration, a transparent glass or glass ceramic pane.

FIG. 1 shows, in schematic illustration, a transparent glass or glass ceramic pane 1, which has a thermal expansion α of less than 4.2.

Applied to the glass substrate 2 is a titanium oxide layer 3, which has a refractive index greater than 2.3 and thus acts as a transparent single-layer reflection layer.

In this case, the titanium oxide layer 3 reflects primarily in the infrared region.

Figure 2:
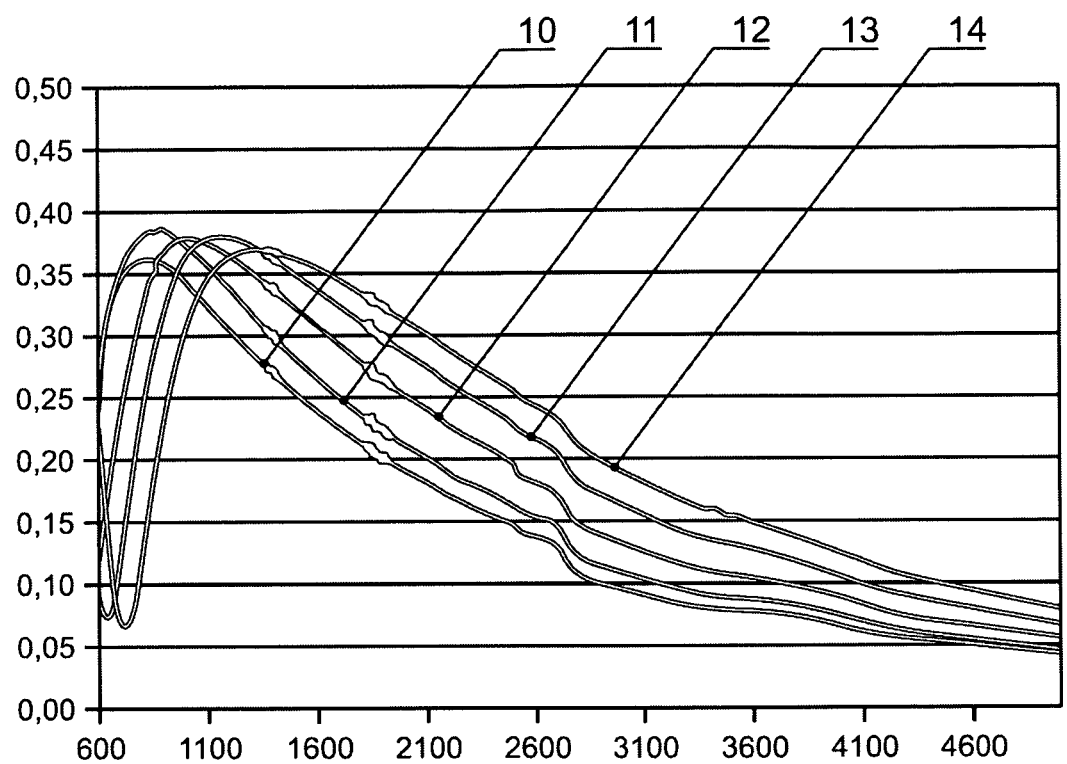
FIG. 2 shows the degree of spectral reflection of various titanium oxide coatings according to the invention.

FIG. 2 shows schematically the curve of the degree of spectral reflection of various exemplary embodiments of a layer that is formed from titanium oxide and reflects infrared radiation with variation of the layer thickness.

Plotted on the x axis is the wavelength in nanometers and plotted on the y axis is the degree of spectral reflection.

Curve 10 shows a titanium oxide layer of about 80-nm thickness with a yellow appearance. Curve 11 shows a titanium oxide layer of about 90-nm thickness, which has a roughly orange-color appearance. A titanium oxide layer of 95-nm thickness, as illustrated in curve 12, has a red color appearance. The titanium oxide layer according to curve 13 is about 127 nm thick and has a blue appearance. A titanium oxide layer of 150-nm thickness is illustrated in curve 14, which has a green color appearance.

It can be seen that the maximum degree of reflection of all illustrated layers has a maximum at a wavelength of between 700 and 1700 nm. At the position of the maximum, the degree of spectral reflection is greater than 0.35 in all exemplary embodiments.

It can be further seen that the maximum reflection of all illustrated coatings lies at less than 1600 nm and thus the coating that reflects infrared radiation is already effective in a quite low-frequency region of the infrared spectrum, whereas conventional coatings that reflect infrared radiation (TCOs) often achieve a detectable effectiveness only above 3000 nm due to their plasma edge.

It can be further seen that, by means of the thickness of the layer, it is possible to determine both the color appearance and the position of the reflection maximum.

The coating can thus be adapted, in an especially simple manner, to the respective application purpose. If a colored appearance is not desired, it is also possible in this case to furnish the substrate with a further layer, which neutralizes the tint.

Figure 3:
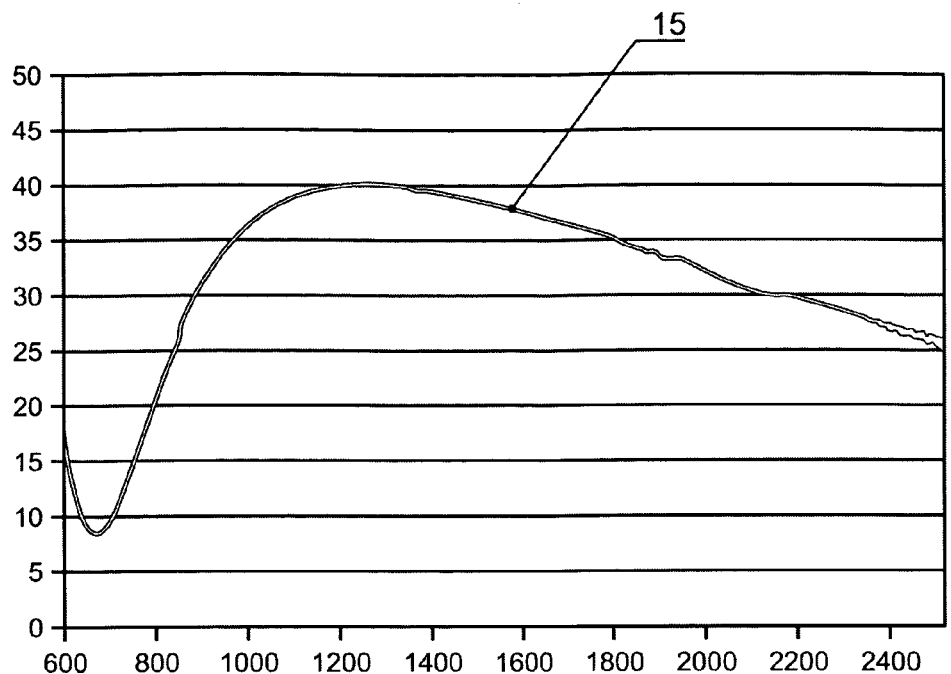
FIG. 3 shows the degree of spectral reflection of an exemplary embodiment of a titanium oxide coating, which was applied prior to a ceramization process.

The curve 15 illustrated in FIG. 3 likewise shows the plot of the degree of spectral reflection of a titanium oxide layer. Here, too, the wavelength is plotted on the x axis and the degree of spectral reflection is plotted on the y axis, here in percent.

What is involved in the case of the titanium oxide layer according to curve 15 is a titanium oxide layer that was deposited by means of a magnetron sputtering process and was already deposited on a green glass prior to the ceramization process.

The corresponding green glass substrate was ceramized after the deposition of the titanium oxide layer and deformed in the process.

Curve 15 represents the plot of the degree of spectral reflection after ceramization.

It can be seen that, in spite of the thermal exposure during the ceramization process, the coating has a maximum of the degree of spectral reflection of just 40%; the reflection maximum continues to lie below 1200 nm. The infrared radiation-reflecting titanium oxide layers according to the invention are thus highly temperature stable.

Figure 4:
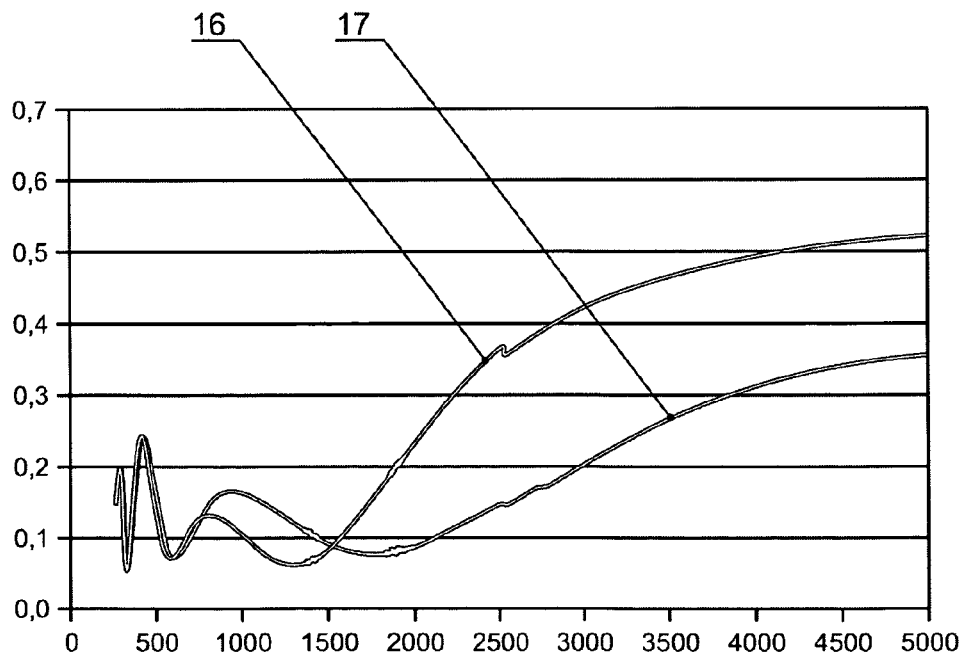
FIG. 4 shows the degree of spectral reflection of a conventional infrared-reflecting glass before and after thermal exposure.

By contrast, FIG. 4 shows the degree of spectral reflection of a conventional infrared radiation-reflecting pane based on a TCO layer.

Here, too, the wavelength is plotted on the x axis in nanometers and the degree of spectral reflection is plotted on the y axis.

Curve 16 shows the degree of spectral reflection prior to a thermal exposure. It can be seen that, in this case, the plasma edge lies above 2000 nm. A degree of reflection of greater than 0.25 therefore lies only in a relatively long-wavelength region.

Curve 17 shows the degree of reflection of the glass pane following a thermal exposure at 500° C. over 100 hours. It can be seen that the degree of reflection in the infrared region has decreased appreciably. For example, the degree of spectral reflection has been reduced by roughly half at a wavelength between 2000 and 4000 nm.

Accordingly, the pane has largely lost its infrared radiation-reflecting characteristics and is therefore not suitable for long-term thermal exposures.

Figure 5:
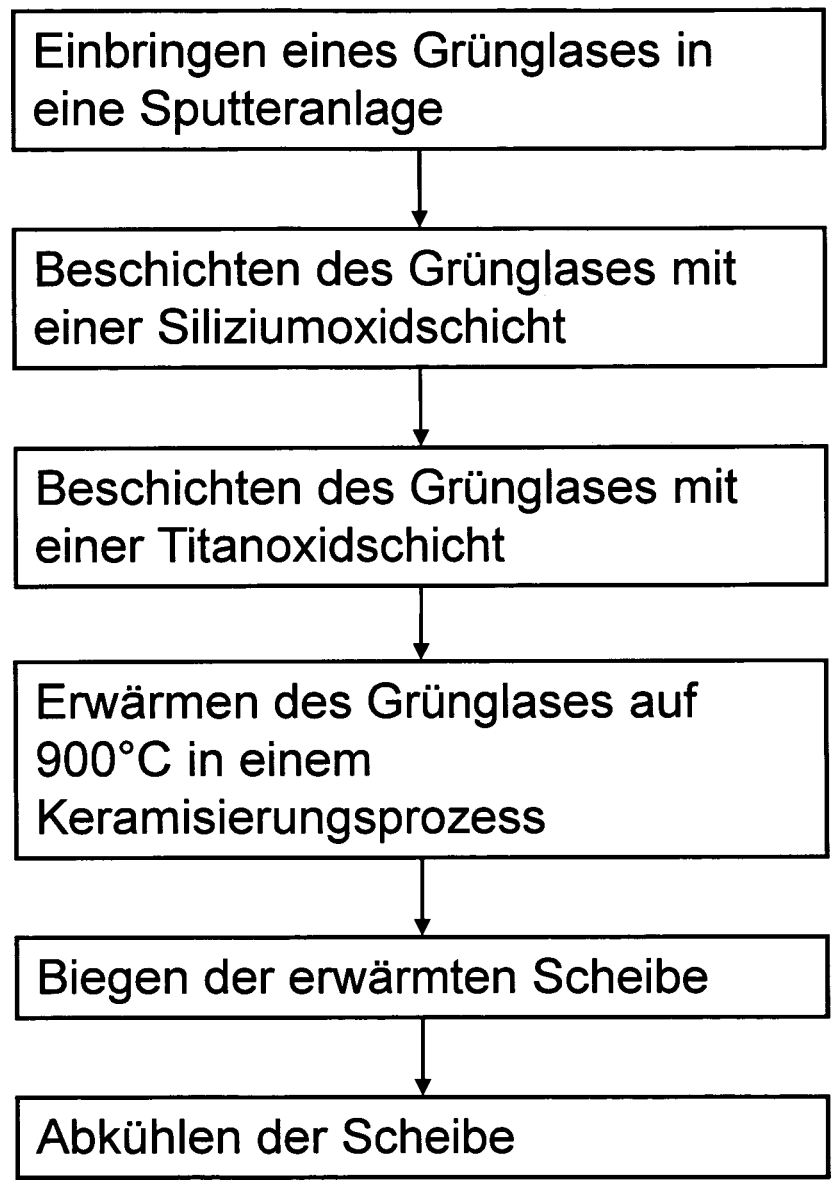
FIG. 5 schematically shows a flow chart of a method for producing a transparent glass or glass ceramic pane in accordance with an exemplary embodiment.

With reference to FIG. 5, the key process steps of a method for applying an infrared radiation-reflecting, single-layer reflection layer according to an exemplary embodiment of the invention will be explained.

First of all, a green glass, that is, a non-ceramized glass substrate, is placed in a sputtering apparatus.

Next, the green glass is coated in a sputtering process with, for example, a silicon oxide layer, which acts as an adhesion-mediating layer. However, other possibilities for applying the silicon layer are also conceivable.

Next, the green glass is coated with, for example, a titanium oxide layer, which is formed as a single-layer reflection layer.

In a ceramization process, the green glass is next heated to 900° C. and the pane is bent while still in the hot state.

After the pane has cooled, a deformed glass ceramic pane that has infrared radiation-reflecting characteristics is obtained. The titanium oxide layer is heat stable so as to have withstood the ceramization process.

The invention thus makes possible a simple and efficient application of heat-stable coatings that reflect infrared radiation.

It is obvious that the invention is not limited to a combination of the features described above and that the skilled practitioner will combine all of the features insofar as this is technically feasible.

What is claimed is:

1. A transparent glass ceramic pane, comprising:
a glass ceramic substrate; and
an infrared radiation-reflecting layer, formed as a single-layer reflection layer, the infrared radiation-reflecting layer having a refractive index greater than 2.2, wherein the infrared radiation-reflecting layer has a thickness between 70 and 200 nm and a reflection maximum in a wavelength range between 700 and 2000 nm.

2. The transparent glass ceramic pane according to claim 1, wherein the infrared radiation-reflecting layer comprises a material selected from the group consisting of titanium oxide, niobium oxide, and tantalum oxide.

3. The transparent glass ceramic pane according to claim 1, wherein the infrared radiation-reflecting layer is a crystalline layer.

4. The transparent glass ceramic pane according to claim 1, wherein the infrared radiation-reflecting layer directly adjoins the glass ceramic substrate.

5. The transparent glass ceramic pane according to claim 1, further comprising an adhesion-mediating layer arranged between the infrared radiation-reflecting layer and the glass ceramic substrate.

6. The transparent glass ceramic pane according to claim 1, wherein the glass ceramic substrate has a degree of reflection of greater than 20% at a wavelength above 1000 nm.

7. The transparent glass ceramic pane according to claim 1, wherein the glass ceramic pane has a mean degree of transmission of greater than 40% in a region of visible light.

8. The transparent glass ceramic pane according to claim 1, wherein the glass ceramic pane has a mean degree of transmission of greater than 70% in a region of visible light.

9. The transparent glass ceramic pane according to claim 1, wherein the glass or glass ceramic pane comprises a bend.

10. The transparent glass ceramic pane according to claim 1, wherein the infrared radiation-reflecting layer has a reflection maximum between 800 and 1700 nm.

11. The transparent glass ceramic pane according to claim 1, wherein the infrared radiation-reflecting layer has a reflection maximum at below 1600 nm.

12. The transparent glass ceramic pane according to claim 1, wherein the infrared radiation-reflecting layer is configured for use at a temperature of greater than 600° C.

13. The transparent glass ceramic pane according to claim 1, wherein the infrared radiation-reflecting layer is configured for use at a temperature of greater than 800° C.

14. The transparent glass ceramic pane according to claim 1, further comprising an anti-reflective layer arranged on the infrared radiation-reflecting layer.

15. The transparent glass ceramic pane according to claim 1, wherein the infrared radiation-reflecting layer comprises a degree of porosity of less than 10%.

16. The transparent glass ceramic pane according to claim 1, wherein the infrared radiation-reflecting layer comprises a degree of porosity of less than 2%.

17. The transparent glass ceramic pane according to claim 1, wherein the transparent glass ceramic pane is configured for use as a front pane for an oven, a front pane for a fireplace, a fire-protection door, or a fire-protection window.

18. A transparent glass pane, comprising:

a transparent, heat stable substrate having a thermal expansion coefficient α of less than $4.2 \times 10^{-6}$/K; and a single layer of titanium oxide deposited on the substrate, the single layer of titanium oxide being sufficient to reflect infrared radiation, wherein the single layer of titanium oxide has a thickness between 70 and 200 nm and a reflection maximum in a wavelength range between 700 and 2000 nm.

* * * * *